United States Patent
Jeon (10) Patent No.: US 7,376,473 B2
(45) Date of Patent: May 20, 2008

(54) AUTOMATIC LPG TANK INSERTION APPARATUS FOR AUTOMOBILES

(75) Inventor: Sun-Kyu Jeon, Hwaseong-si (KR)

(73) Assignee: Kia Motors Corporation, Seoul (KR)

( * ) Notice: Subject to any disclaimer, the term of this patent is extended or adjusted under 35 U.S.C. 154(b) by 371 days.

(21) Appl. No.: 11/299,365

(22) Filed: Dec. 8, 2005

(65) Prior Publication Data

US 2007/0094755 A1 Apr. 26, 2007

(30) Foreign Application Priority Data

Oct. 26, 2005 (KR) ................ 10-2005-0101198

(51) Int. Cl.
*G05B 19/18* (2006.01)
*B66C 23/26* (2006.01)

(52) U.S. Cl. .............. 700/62; 414/591; 414/739; 212/175

(58) Field of Classification Search ........... 700/62, 700/64; 414/591, 739; 212/175
See application file for complete search history.

(56) References Cited

U.S. PATENT DOCUMENTS

| 4,132,318 | A |   | 1/1979 | Wang et al. |
| 4,669,168 | A | * | 6/1987 | Tamura et al. ............ 29/429 |
| 5,513,428 | A | * | 5/1996 | Shiramizu et al. ........ 29/712 |
| 5,934,490 | A | * | 8/1999 | Mora ...................... 212/176 |
| 6,286,695 | B1 | * | 9/2001 | Tetreault ................. 212/203 |
| 6,604,279 | B2 | * | 8/2003 | Kurtz ...................... 29/705 |
| 7,055,233 | B1 | * | 6/2006 | Hofer et al. ............. 29/430 |

FOREIGN PATENT DOCUMENTS

| JP | 61132477 |   | 6/1986 |
| JP | 06-087476 | * | 3/1994 |
| JP | 6087476 |   | 3/1994 |
| JP | 11019894 |   | 1/1999 |
| JP | 200-086183 | * | 3/2000 |

OTHER PUBLICATIONS

Tso et al., An automated Gas Station Attendant, Mar./Apr. 2002, IEEE Intelligent Systems, pp. 84-87.*

* cited by examiner

*Primary Examiner*—Zoila Cabrera
(74) *Attorney, Agent, or Firm*—Morgan Lewis & Bockius LLP (57) ABSTRACT

An automatic LPG tank insertion apparatus for automobiles has a rotary column provided with a lift body, which has a support arm. A rotating plate is rotatably mounted to the support arm such that yaw, pitch, and roll of the rotating plate can be controlled separately. Clamping devices are mounted on the rotating plate to selectively clamp an LPG tank. A trunk opening area measuring device includes a base unit, a guide shaft, a ruler shaft, and an encoder. Trunk opening sizes and LPG tank dimensions for various vehicle models are stored in a control computer. When vehicle model is input to the control computer, yaw, pitch, and roll of the rotating plate are adjusted so that the LPG tank can be inserted into a vehicle trunk.

7 Claims, 8 Drawing Sheets

AUTOMATIC LPG TANK INSERTION APPARATUS FOR AUTOMOBILES

CROSS-REFERENCE TO RELATED APPLICATIONS

The present application is based on, and claims priority from, Korean Application Ser. No. 10-2005-0101198, filed on Oct. 26, 2005, the disclosure of which is hereby incorporated by reference herein in its entirety.

FIELD OF THE INVENTION

The present invention relates to LPG tank insertion apparatuses for automobiles and, more particularly, to an automatic LPG tank insertion apparatus for automobiles which may be used regardless of an automobile model.

BACKGROUND OF THE INVENTION

Generally, in automobiles using LPG (liquid petroleum gas) as fuel, an LPG tank is installed in the trunk of an automobile.

In the case that the length of the LPG tank is shorter than the length of the opening of the trunk, a worker easily inserts the LPG tank into the trunk using a typical hanger having a wire and a pulley. However, if the length of the LPG tank is longer than the length of the opening of the trunk, because the LPG tank interferes with the edge of the opening of the trunk, there is difficulty in insertion of the LPG tank into the trunk.

SUMMARY OF THE INVENTION

Embodiments of the present invention provide an automatic LPG tank insertion apparatus for automobiles which automatically adjusts the position of an LPG tank to be inserted into the trunk of an automobile according to the model of the automobile which is being carried by a conveyor, thus being used regardless of the automobile model.

An automatic LPG tank insertion apparatus for an automobile according to an embodiment of the present invention includes a rotary column provided with a lift body. A support arm is horizontally mounted to the lift body. A rotating plate is rotatably mounted to an end of the support arm. A clamping device is mounted at each of upper and lower positions to a first surface of the rotating plate. A pneumatic pressure supply device supplies pneumatic pressure to clamping cylinders provided in the clamping devices. A yaw adjusting motor is mounted to a downwardly bent end of the support in a downward direction. A pitch adjusting motor is mounted to a yawing member and fastened to a rotating shaft of the yaw adjusting motor, in a lateral direction of a trunk of the automobile. A roll adjusting motor is mounted to a rotating shaft of the pitch adjusting motor in a forward-backward direction of the trunk. A trunk opening area measuring device measures an area of an opening of the trunk. An automobile model detecting sensor identifies a model of the automobile carried by a conveyor. A control computer is provided, in which trunk opening areas measured by the trunk opening area measuring device, depending on an automobile model, and sizes of LPG tanks, depending on the automobile model, are input, so that the control computer identifies the model of the automobile to be carried by the conveyor and adjusts the yaw adjusting motor, the pitch adjusting motor and the roll adjusting motor such that the LPG tank is oriented in a position allowing the LPG tank to be inserted into the trunk without interference.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Hereinafter, a preferred embodiment of the present invention will be described in detail with reference to the attached drawings.

As shown in the drawings, the automatic LPG tank insertion apparatus of the present invention includes a rotary column 10, which is fastened at a predetermined position to a support surface, and an entire body of which is rotatable. A lift body 20 is provided on the rotary column 10 so as to be movable upwards and downwards along the rotary column 10. A support arm 30 is mounted to the lift body 20 in a direction parallel to the support surface. The support arm 30 is perpendicularly bent at an end thereof towards the support surface.

A yaw adjusting motor 40 is mounted to the bent end of the support arm 30 such that a rotating shaft thereof is perpendicular to the support surface. The rotating shaft of the yaw adjusting motor 40 is coupled to a yawing member 42 which has a rectangular frame shape that is open at a lower end thereof. A pitch adjusting motor 44 is horizontally provided through a sidewall of the yawing member 42. That is, the rotating shaft of the pitch adjusting motor 44 protrudes into the inner space of the yawing member 42. A roll adjusting motor 46 is disposed between vertical sidewalls of the yawing member 42. The roll adjusting motor 46 is fastened to the rotating shaft of the pitch adjusting motor 44. A rotating shaft of the roll adjusting motor 46 is oriented in the direction perpendicular to the rotating shaft of the pitch adjusting motor 44 and is fastened to the front surface of a rotating plate 60 to which clamping devices 80 are mounted.

Therefore, the yaw adjusting motor 40 rotates the rotating plate 60 around a Z axis, the pitch adjusting motor 44 rotates the rotating plate 60 around a Y axis, and the roll adjusting motor 46 rotates the rotating plate 60 around an X axis.

The clamping devices 80 are mounted at respective upper and lower positions to a rear surface of the rotating plate 60.

Each clamping device 80 includes a clamping cylinder 82 which is operated using pneumatic pressure supplied from a pneumatic pressure supply device (not shown), and a clamping member 83 which is advanced and retracted by the clamping cylinder 82 and is thus inserted into or removed from a latch holder (T') provided on an LPG tank (T). The clamping devices 80 removably couple the LPG tank (T) to the rotating plate 60.

The clamping cylinders 82 are connected to the pneumatic pressure supply device through pressure hoses (not shown). Furthermore, in the case that there are several LPG tank insertion apparatuses in a plant, the pneumatic pressure supply device may comprise several independent devices, each of which includes a compressor, a pressure tank, a valve, etc., and each of which is independently coupled to a respective LPG tank insertion apparatus. Alternatively, the pneumatic pressure supply device may comprise a single pneumatic pressure supply system disposed at a predetermined position in the plant. The present invention is not limited to any one case.

The trunk opening area measuring device 100 includes a base unit 110 which is placed at a central portion thereof and a guide shaft 120 which is provided at a medial position on each of sidewalls of the base unit 110. The trunk opening area measuring device 100 further includes a ruler shaft 150 which is movable in the longitudinal direction of each guide shaft 120 such that the relative position of the ruler shaft 150 to the guide shaft 120 is adjusted, and an encoder 170 which measures the moving distance of each ruler shaft 150.

Each guide shaft 120 perpendicularly protrudes from each of the sidewalls of the base unit 110. Two guide plates 130 and 140 are provided on each guide shaft 120 at end and medial positions spaced apart from each other by a predetermined distance.

Each ruler shaft 150 is mounted through the two guide plates 130 and 140 of each guide shaft 120. A plurality of gear notches 151 is formed in the ruler shaft 150, and an L-shaped support 160 is provided on an end of the ruler shaft 150.

The encoder 170 is provided on one guide plate 130 or 140 of each guide shaft 120, so that when the ruler shaft 150 is advanced from an initial position (the position of the ruler shaft 150 when the L-shaped support 160 is in contact with a stopper 180 provided on the end of the guide shaft 120), the encoder 170 counts the number of rotations of an inside gear, which is disposed in the encoder 170 and engages with the gear notches 151, and inputs it to a control computer 200.

In other words, when the trunk opening area measuring device 100 is installed such that the L-shaped supports 160 of the ruler shafts 150, which are advanced by a worker, are brought into contact with the edge of the opening of the trunk of an automobile, the encoders 170 sends information about lengths of advancement of the ruler shafts 150 to the control computer 200.

The control computer 200, which may comprise a processor, memory, and associated hardware, software and/or firmware as may be selected and programmed by a person of ordinary skill in the art based on the teachings, of the present invention, computes the lengths of advancement of the ruler shafts 150 using the counted numbers of rotation of inside gears, which are input from the encoders 170. The control computer 200 adds the lengths of advancement to initial values (default values of the ruler shafts 150 when placed at the initial positions), calculates the area (normal area) of the opening of the trunk, to which the opening area measuring device is mounted, and stores this along with an automobile model, which is input by the worker.

As such, when the area of the opening of the trunk of a new automobile model is measured and the automobile model is input to the control computer 200, the worker also inputs the size of an LPG tank for the automobile model.

That is, only when a new automobile model is added to an assembly line is the trunk opening area measuring device 100 installed by the worker to measure the area of the opening of the trunk.

Meanwhile, the control computer 200 identifies the automobile model that is being carried towards the automatic LPG tank insertion apparatus, using an automobile model detecting sensor (not shown) which is mounted to the assembly line. This may be constructed by the installation of a transmitter and a sensor in a hanger, at sides of a cart or at predetermined positions adjacent to the automatic LPG tank insertion apparatus.

Alternatively, the order of supply of automobile models may be previously input to the control computer 200 without a separate automobile model detecting sensor, so that the model of an automobile to be carried towards the automatic LPG tank insertion apparatus is known.

When the control computer 200 identifies the model of automobile that approaches the automatic LPG tank insertion apparatus, the control computer 200 compares the size of the LPG tank (T) to the preset area of the opening of the trunk of the associated automobile model and calculates the angle of rotation of the LPG tank (T) such that the dimension of the LPG tank (T) in an insert direction is smaller than the area of the opening of the trunk using a projection formula.

Figure 1:
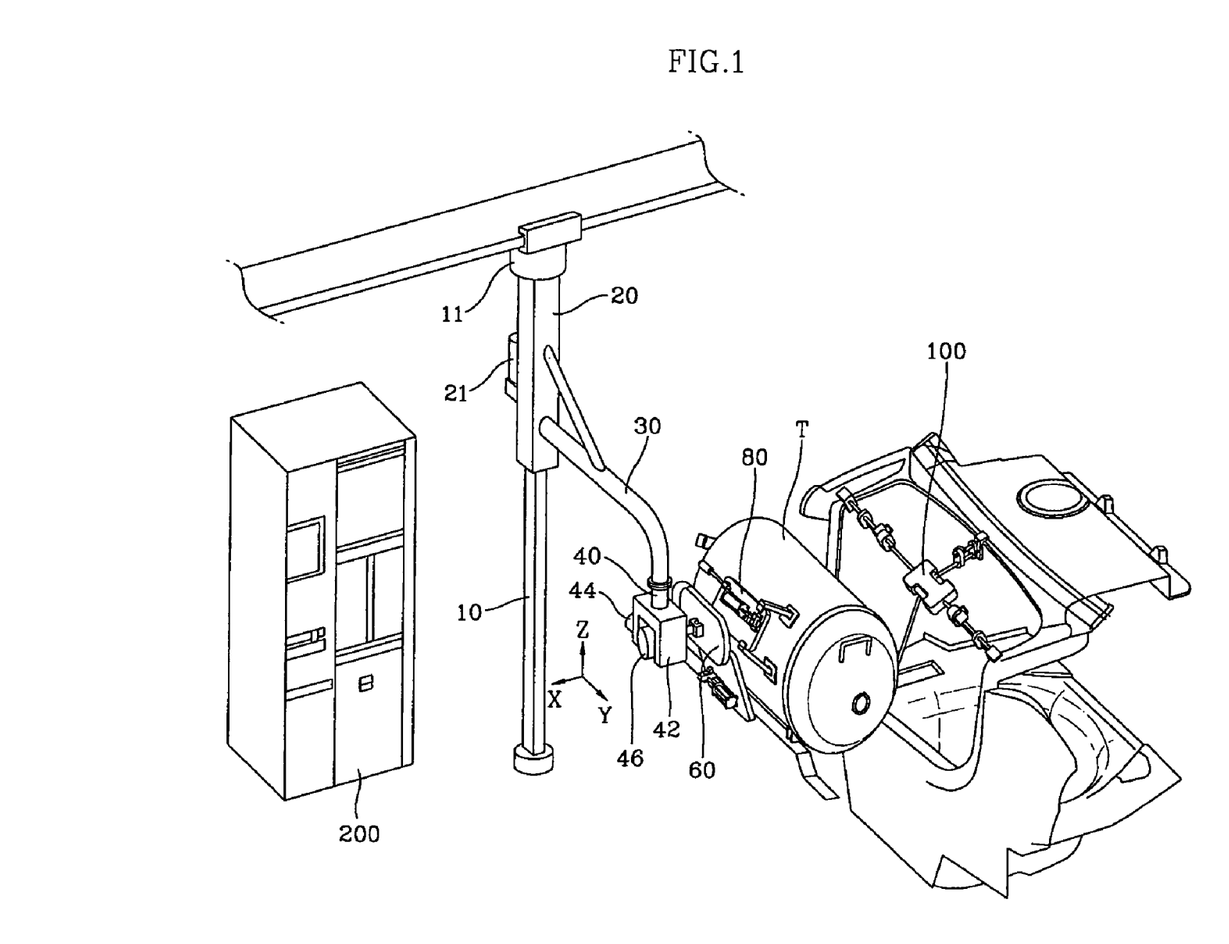
FIG. 1 is a view showing an automatic LPG tank insertion apparatus for automobiles, according to a preferred embodiment of the present invention.
Figure 2:
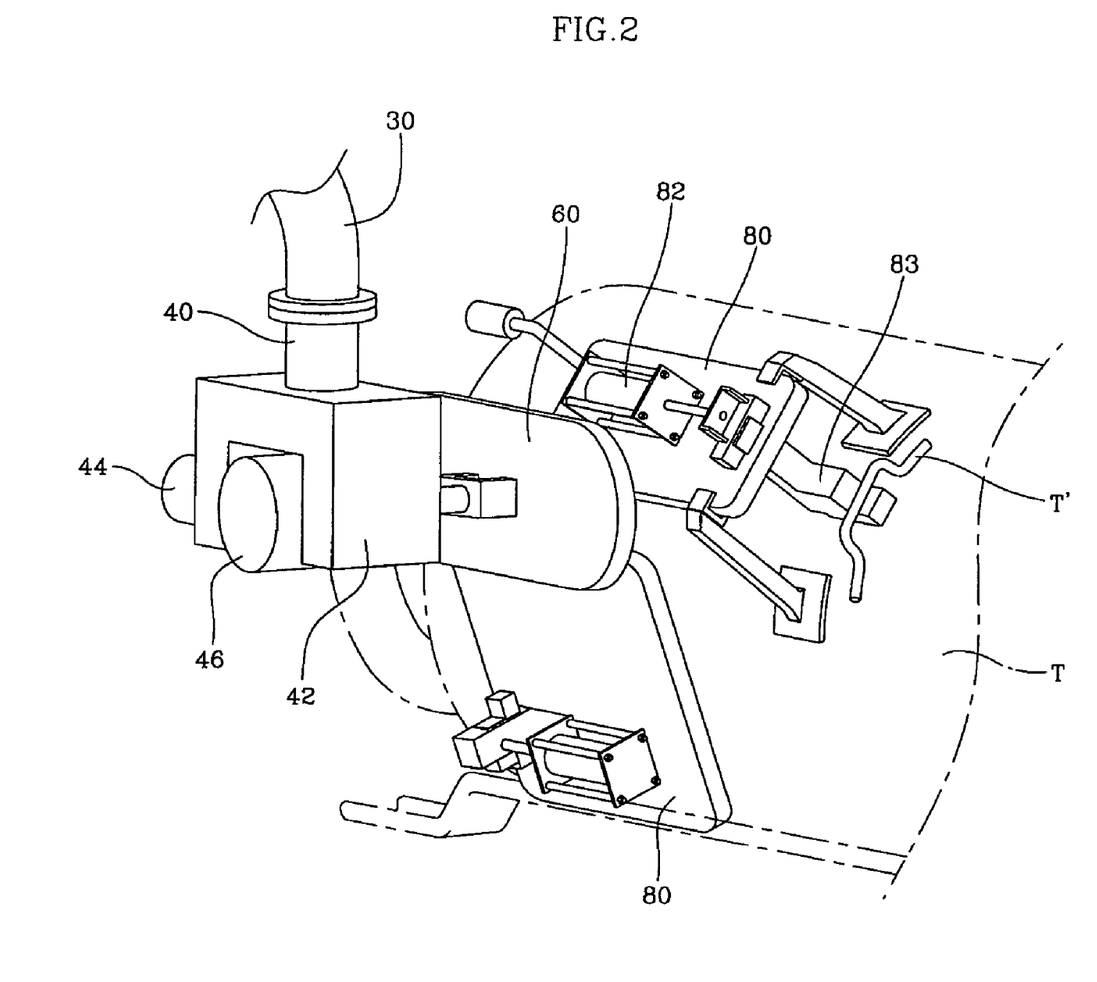
FIG. 2 is a perspective view showing an enlargement of an important part of the automatic LPG tank insertion apparatus of FIG. 1.
Figure 3:
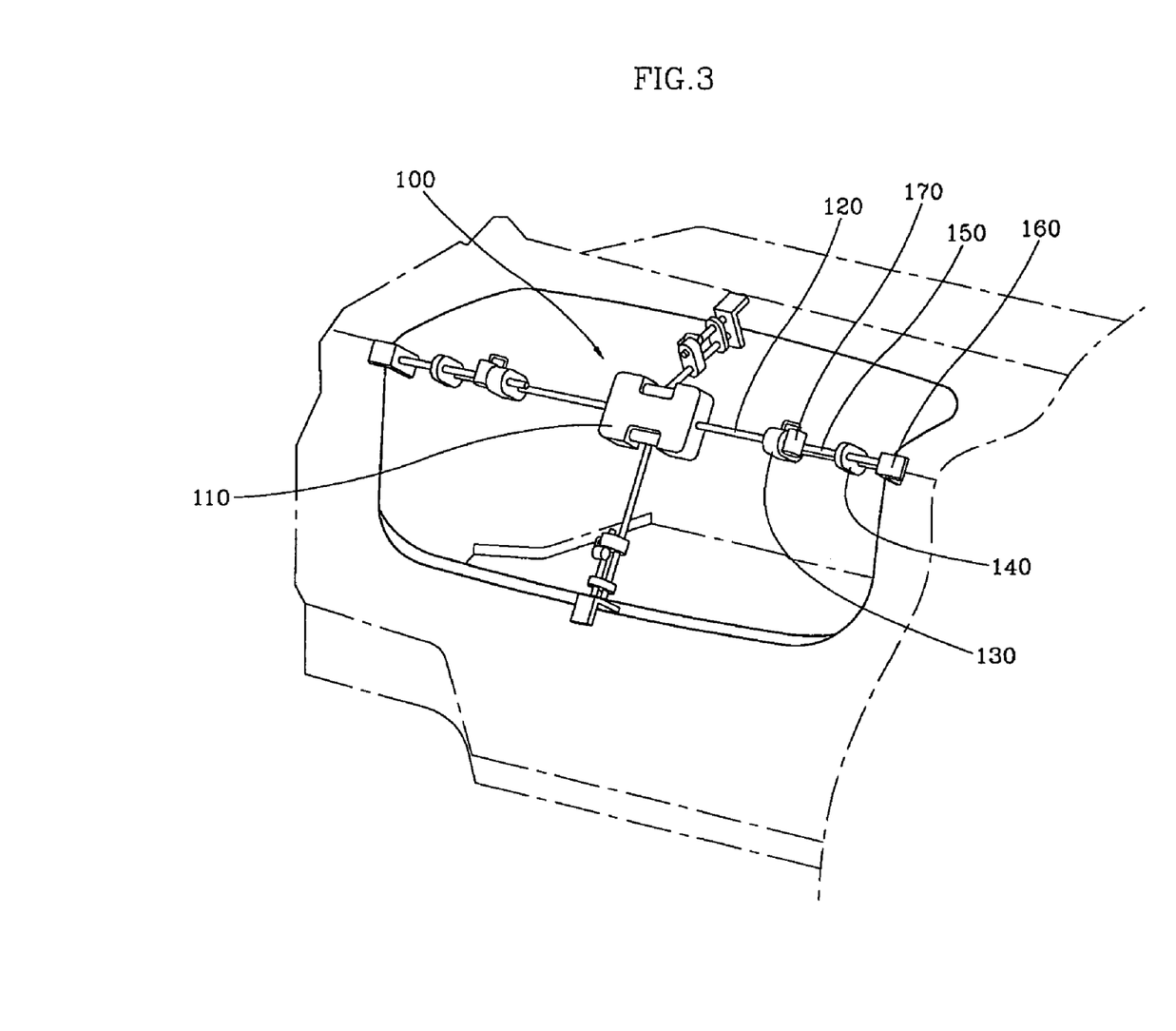
FIG. 3 is a view showing installation of a trunk opening area measuring device of the automatic LPG tank insertion apparatus of FIG. 1.
Figure 4:
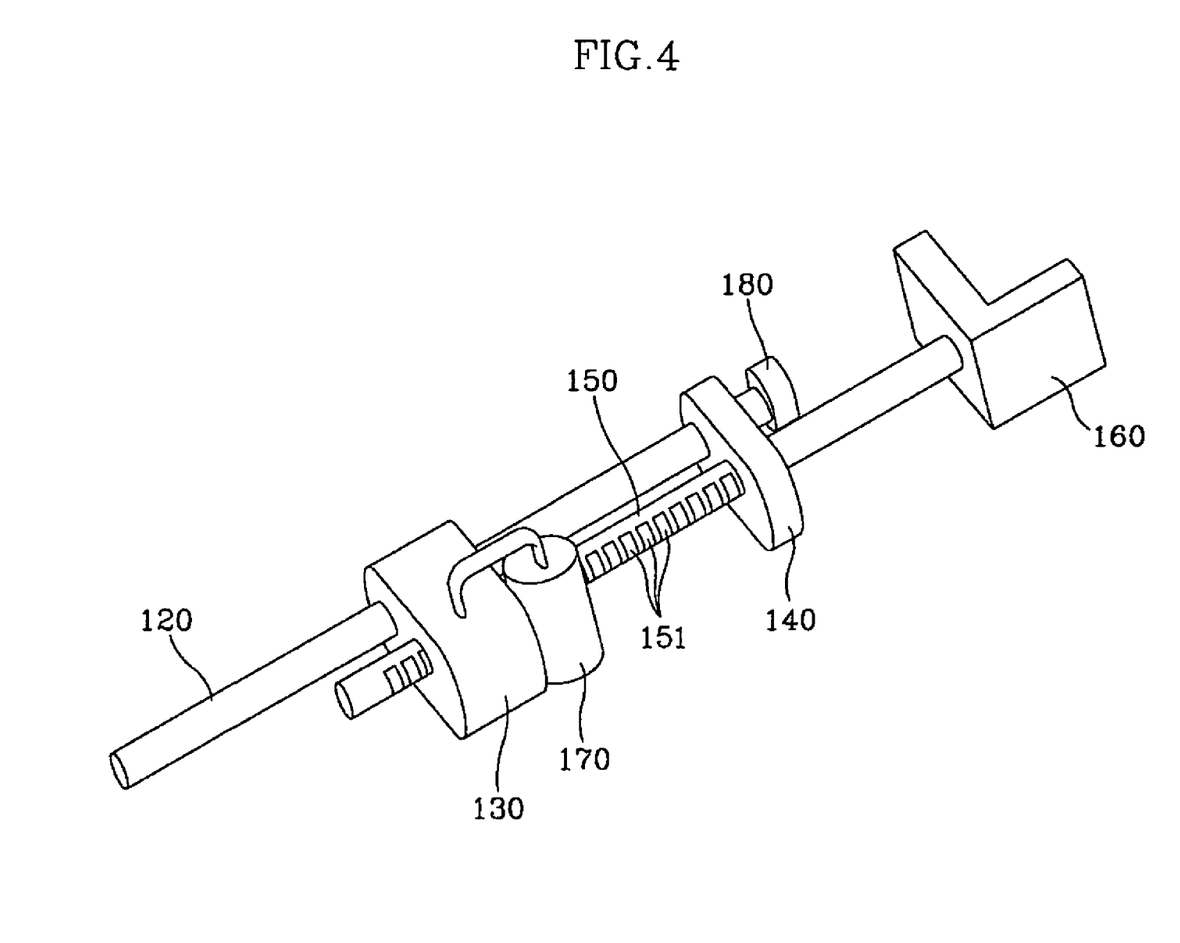
FIG. 4 is a perspective view showing an enlargement of a part of the trunk opening area measuring device of FIG. 3.
Figure 5:
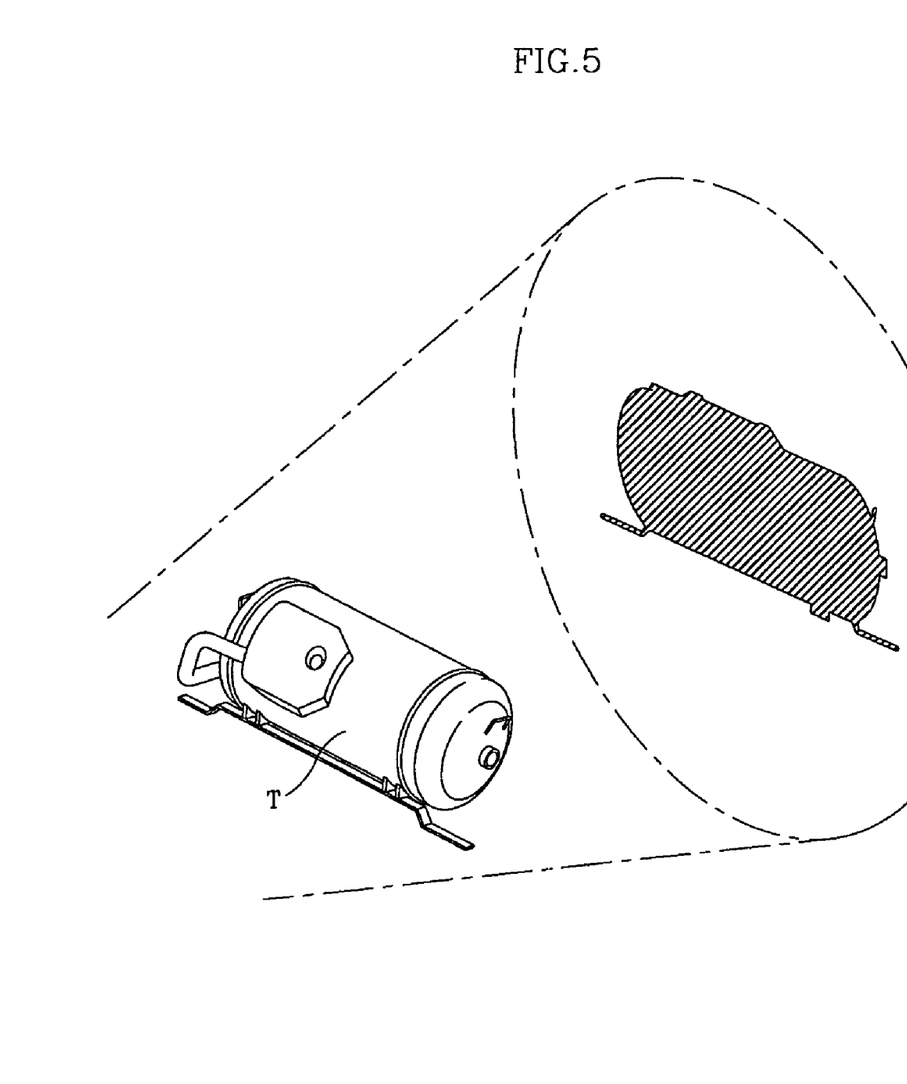
FIG. 5 is a front projected view of an LPG tank to be held by the automatic LPG tank insertion apparatus of FIG. 1.
Figure 6:
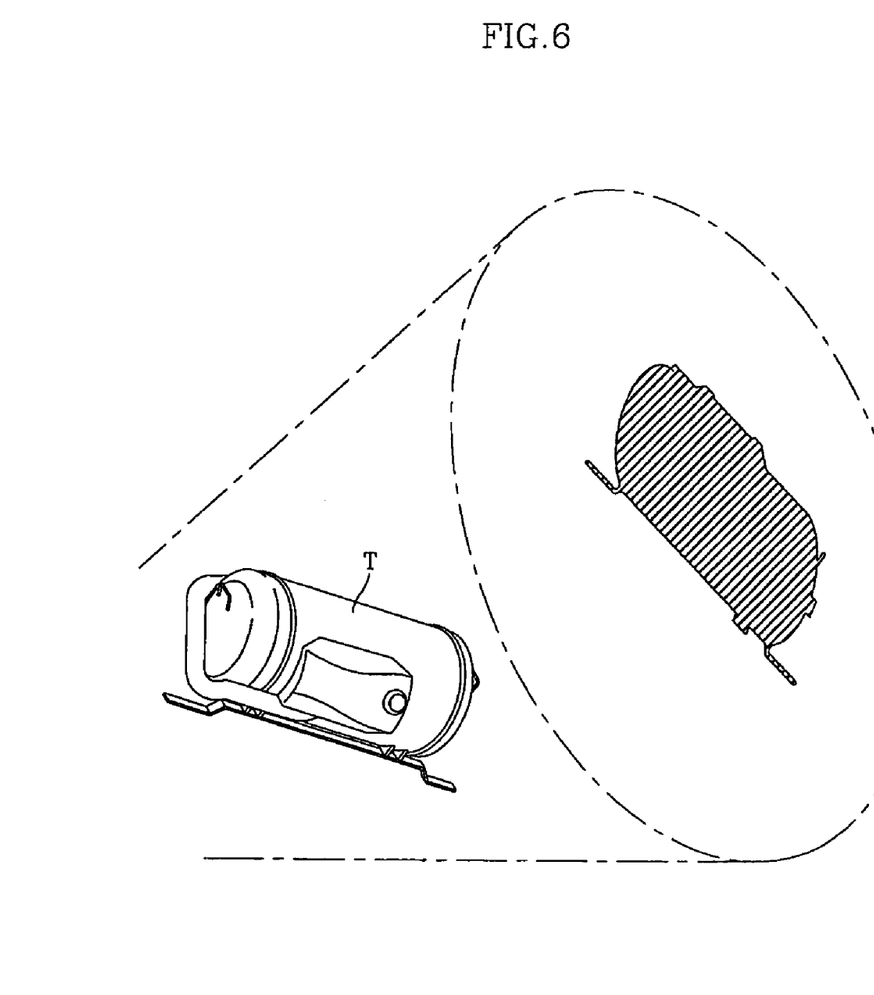
FIG. 6 is a projected view of the LPG tank of FIG. 5 when rotated at an angle of 45 degrees.
Figure 7:
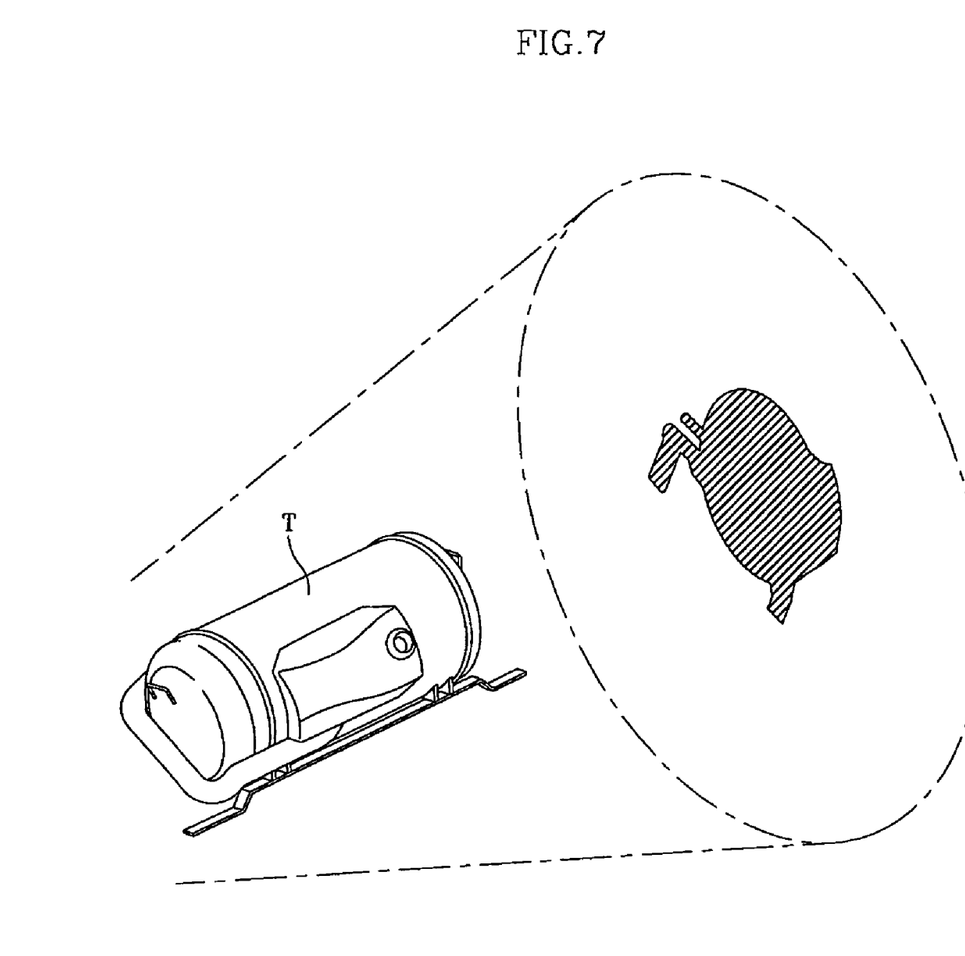
FIG. 7 is a projected view of the LPG tank of FIG. 5 when rotated at an angle of 90 degrees.

As shown in FIGS. 5-7, When the LPG tank (T) is not rotated, the LPG tank in the projected view maintains its size at a ratio of 1:1. When the LPG tank (T) is rotated at 45°, the length of the LPG tank in the projected view is reduced to 70%, which is a value of cos 45°. When the LPG tank (T) is rotated at 90°, the length of the associated side of the LPG tank in the projected view becomes zero, while only the shortest length of the projected LPG tank remains. That is, as the LPG tank (T) is rotated, the length of the LPG tank (T) in an insert direction is reduced.

The above-mentioned relation is expressed as a projection formula of $N = A \cdot \cos \alpha$ (N; an insert directional length of the LPG tank when rotated, A; a real length of the LPG tank, $\alpha$; rotating angle).

When the model of automobile that approaches the automatic LPG tank insertion apparatus is identified, the control computer 200 determines rotating angles of the yaw adjusting motor 40, the pitch adjusting motor 44 and the roll adjusting motor 46 using the projection formula.

At this time, if an insert directional length (N) of the rotated LPG tank is shorter than that of the opening of the trunk of the automobile, it satisfies noninterfering insertion conditions. However, in consideration of a spare length of from approximately 2 cm to approximately 3 cm between each of opposite ends of the LPG tank (T) and the edge of the opening of the trunk in order to increase the reliability of a noninterfering insertion process, the rotating angles of the motors 40, 44 and 46 are determined such that the insert directional length (N) of the rotated LPG tank is sufficiently reduced.

Meanwhile, a column rotating motor 11 which rotates the rotary column 10 is provided in the rotary column 10. A lift motor 21 which vertically moves the lift body 20 is provided in the lift body 20. These are controlled by the control computer 200.

Figure 8:
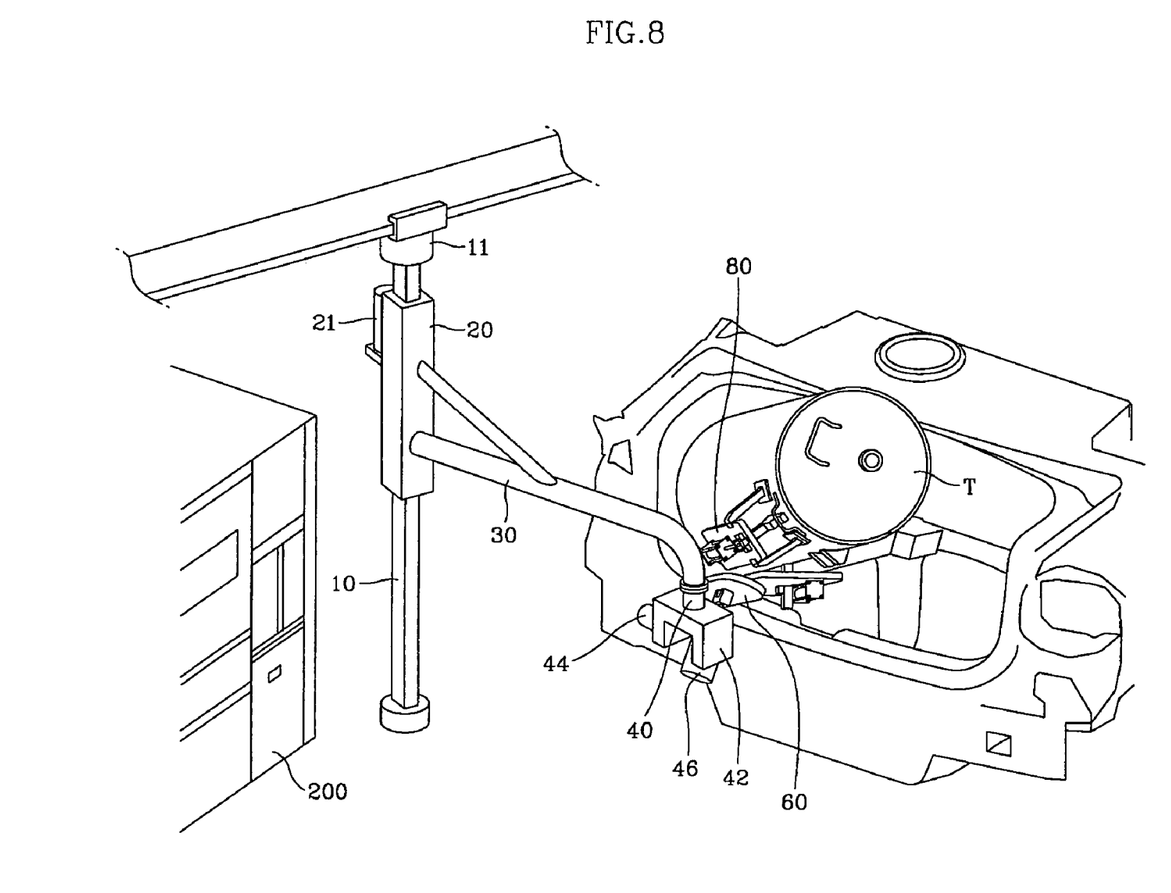
FIG. 8 is a view showing the operation of the automatic LPG tank insertion apparatus of FIG. 1.

After each LPG tank insertion process has been completed, the control computer 200 operates the column rotating motor 11 and the lift motor 21 in order to return the support arm 30 to the initial position thereof. Thereafter, the control computer 200 controls the pneumatic pressure supply device (in detail, the control computer controls an electronic valve provided on an outlet of the pneumatic pressure supply device), thus operating the clamping cylinders 82. Then, the automatic LPG tank insertion apparatus grasps a subsequent LPG tank (T) and stands by in this state. Subsequently, when a target automobile (an automobile in which the LPG tank is to inserted) passes by the LPG tank insertion apparatus, the control computer 200 reversely rotates the column motor 11 and the lift motor 21 at speeds synchronizing with the movement speed of the automobile such that the LPG tank is placed ahead of the trunk of the automobile. Thereafter, in the same manner as the above-mentioned process, the motors 40, 44 and 46 are rotated at the calculated rotating angles so as to rotate the LPG tank (T) to a position allowing the LPG tank (T) to be inserted into the trunk of the automobile without interference (see FIG. 8). Subsequently, the support arm 30 is moved along an insertion path preset such that interference does not occur. As a result, the LPG tank (T) is inserted into the trunk.

After the LPG tank (T) insertion process has been completed, the clamping devices 80 release the LPG tank and leave it in the trunk. Thereafter, the support arm 30 is returned along a returning path, which is the opposite of the insertion path, to its initial position, at which a subsequent LPG tank is standing by.

As is apparent from the foregoing, the present invention provides an automatic LPG tank insertion apparatus for automobiles which automatically adjusts the position of an LPG tank to be inserted into the trunk of an automobile according to the model of automobile which is being carried by a conveyor, thus being usable regardless of automobile model.

Furthermore, because an LPG tank insertion process is automatically performed, the present invention solves a problem of mental and physical burdens on a worker.

What is claimed is:

1. An automatic LPG tank insertion apparatus for an automobile, comprising:
    a rotary column provided with a lift body;
    a support arm mounted to the lift body;
    a rotating plate rotatably mounted to an end of the support arm;
    means for selectively clamping the rotating plate to an LPG tank;
    means for adjusting yaw, pitch, and roll of the rotating plate;
    a trunk opening area measuring device;
    an automobile model detecting sensor; and
    a control computer, in which trunk opening areas of various automobile models measured by the trunk opening area measuring device, and sizes of LPG tanks of various automobile models are input, so that the control computer identifies a model of an automobile and adjusts the means for adjusting yaw, pitch, and roll of the rotating plate such that the LPG tank is oriented in a position allowing the LPG tank to be inserted into a trunk of the automobile without interference.

2. The automatic LPG tank insertion apparatus as defined in claim 1, wherein the means for selectively clamping the rotating plate to the LPG comprises:
    a pair of clamping devices mounted to a rear surface of the rotating plate; and
    a pneumatic pressure supply device that supplies pneumatic pressure to clamping cylinders provided in the clamping devices.

3. The automatic LPG tank insertion apparatus as defined in claim 1, wherein the means for adjusting the yaw, pitch, and roll of the rotating plate comprises:
    a yaw adjusting motor mounted to a downwardly bent end of the support arm in a downward direction;
    a pitch adjusting motor mounted to a yawing member, fastened to a rotating shaft of the yaw adjusting motor, in a lateral direction of the trunk; and
    a roll adjusting motor mounted to a rotating shaft of the pitch adjusting motor in a forward-backward direction of the trunk with a rotating shaft fastened to a front surface of the rotating plate.

4. The automatic LPG tank insertion apparatus as defined in claim 1, wherein the control computer compares a size of the LPG tank to an area of the opening of the trunk and determines rotating angles of the means for adjusting the yaw, pitch, and roll of the rotating plate, such that a projected area of the rotated LPG tank is smaller than an area of an opening of the trunk.

5. The automatic LPG tank insertion apparatus as defined in claim 1, further comprising:
    a column rotating motor and a lift motor respectively provided in the rotary column and the lift body and controlled by the control computer such that the support arm is moved along a preset insertion path or returning path.

6. The automatic LPG tank insertion apparatus as defined in claim 3, wherein the yawing member has a rectangular frame shape that is open at a lower end thereof, the pitch adjusting motor is provided through a sidewall of the yawing member, and the roll adjusting motor is disposed between sidewalls of the yawing member.

7. The automatic LPG tank insertion apparatus as defined in claim 1, wherein the trunk opening area measuring device comprises:
    a base unit;
    a guide shaft provided at a medial position on each of two sidewalls of the base unit;
    two guide plates provided on each guide shaft at a predetermined distance from one another;
    a ruler shaft provided through the guide plates of each of the guide shafts and comprising:
        a support provided on an end of the ruler shaft so that the support is brought into contact with an edge of an opening of the trunk; and
        a plurality of gear notches on an outer surface of the ruler shaft; and
    an encoder provided in one of the guide plates of each guide shaft, so that, while the ruler shaft is advanced from an initial position, at which the support contacts a stopper provided on an end of each guide shaft, the encoder counts the number of rotations of an inside gear, which engages with the gear notches, and sends the number of rotations of the inside gear to the control computer.

* * * * *